(12) United States Patent
Kim et al.

(10) Patent No.: US 8,471,981 B2
(45) Date of Patent: Jun. 25, 2013

(54) DISPLAY APPARATUS AND DISPLAY SET HAVING THE SAME

(75) Inventors: Hyuk-Jin Kim, Asan-si (KR); Kyoung Tai Han, Asan-si (KR); SangKi Kwak, Asan-si (KR); HyungJun Park, Seongnam-si (KR)

(73) Assignee: Samsung Display Co., Ltd., Yongin (KR)

( * ) Notice: Subject to any disclaimer, the term of this patent is extended or adjusted under 35 U.S.C. 154(b) by 161 days.

(21) Appl. No.: 13/191,091

(22) Filed: Jul. 26, 2011

(65) Prior Publication Data

US 2012/0194773 A1 Aug. 2, 2012

(30) Foreign Application Priority Data

Feb. 1, 2011 (KR) .......................... 10-2011-0009987

(51) Int. Cl.
*G02F 1/133* (2006.01)
*G02F 1/1343* (2006.01)

(52) U.S. Cl.
USPC ........................................... 349/73; 349/151

(58) Field of Classification Search
USPC .................................................... 349/73, 151
See application file for complete search history.

(56) References Cited

U.S. PATENT DOCUMENTS 6,005,645 A * 12/1999 Hirakata et al. ................ 349/15

FOREIGN PATENT DOCUMENTS

| JP | 2001-109405 | 4/2001 |
|---|---|---|
| KR | 10-2009-0080404 | 7/2009 |
| KR | 10-2010-0018764 | 2/2010 |

* cited by examiner

*Primary Examiner* — James Dudek
(74) *Attorney, Agent, or Firm* — H.C. Park & Associates, PLC

(57) ABSTRACT

A display apparatus includes: a substrate including display areas and a non-display area disposed around edges of the display areas; gate lines disposed in the display areas; data lines disposed in the display areas and crossing the gate lines; pixels disposed in the display areas and connected to the gate lines and data lines; and a gate driver disposed in the peripheral area, between the display areas. The gate driver is connected to the gate lines, to output gate signals to the gate lines.

12 Claims, 12 Drawing Sheets

DISPLAY APPARATUS AND DISPLAY SET HAVING THE SAME

CROSS-REFERENCE TO RELATED APPLICATION

This application relies for priority upon Korean Patent Application No. 10-2011-0009987 filed on Feb. 1, 2011, which is hereby incorporated by reference for all purposes as if fully set forth herein.

BACKGROUND

1. Field of the Invention

Exemplary embodiments of the present invention relate to a large-scale display apparatus having improved display quality and a display set having the display apparatus.

2. Discussion of the Background

In general, a liquid crystal display includes a display panel to display an image and a driving circuit to drive the display panel. The display panel includes a plurality of pixels to display the image. In addition, the display panel further includes data lines and gate lines to apply a data signal and a gate signal output from the driving circuit to the pixels.

However, in a large-scale display panel having a relatively long signal line, e.g., a long gate line, as compared to a conventional display panel, an input signal may be distorted while being transmitted through the signal line. As a result, the large-scale display panel may have a relatively poor display quality, as compared to a conventional display panel.

SUMMARY

Exemplary embodiments of the present invention provide a large-scale display apparatus having improved display quality.

Exemplary embodiments of the present invention provide a display set having the display apparatus.

Additional features of the invention will be set forth in the description which follows, and in part will be apparent from the description, or may be learned by practice of the invention.

According to the exemplary embodiments of the present invention, a display apparatus includes: a substrate including display areas and a non-display area disposed around edges of the display areas; gate lines disposed in the display areas, data lines disposed in the display areas and crossing the gate lines; pixels disposed in the display areas and connected to the gate lines and data lines; and a gate driver disposed in the peripheral area and between the display areas. The gate driver is connected to the gate lines, to output a gate signals.

According to the exemplary embodiments of the present invention, a display set includes a plurality of the display apparatuses and a chassis including a matrix of openings. The display apparatus are disposed in the chassis, such that the display areas are exposed through the openings. Data drivers of the display apparatuses are disposed adjunct to edges of the chassis.

According to the above, the gate driver is disposed at a center portion of the display panel. Thus, the gate signal may be prevented from being distorted although the gate signal is transmitted through a relatively long transmission line like the gate line, thereby improving a display quality of the display apparatus.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
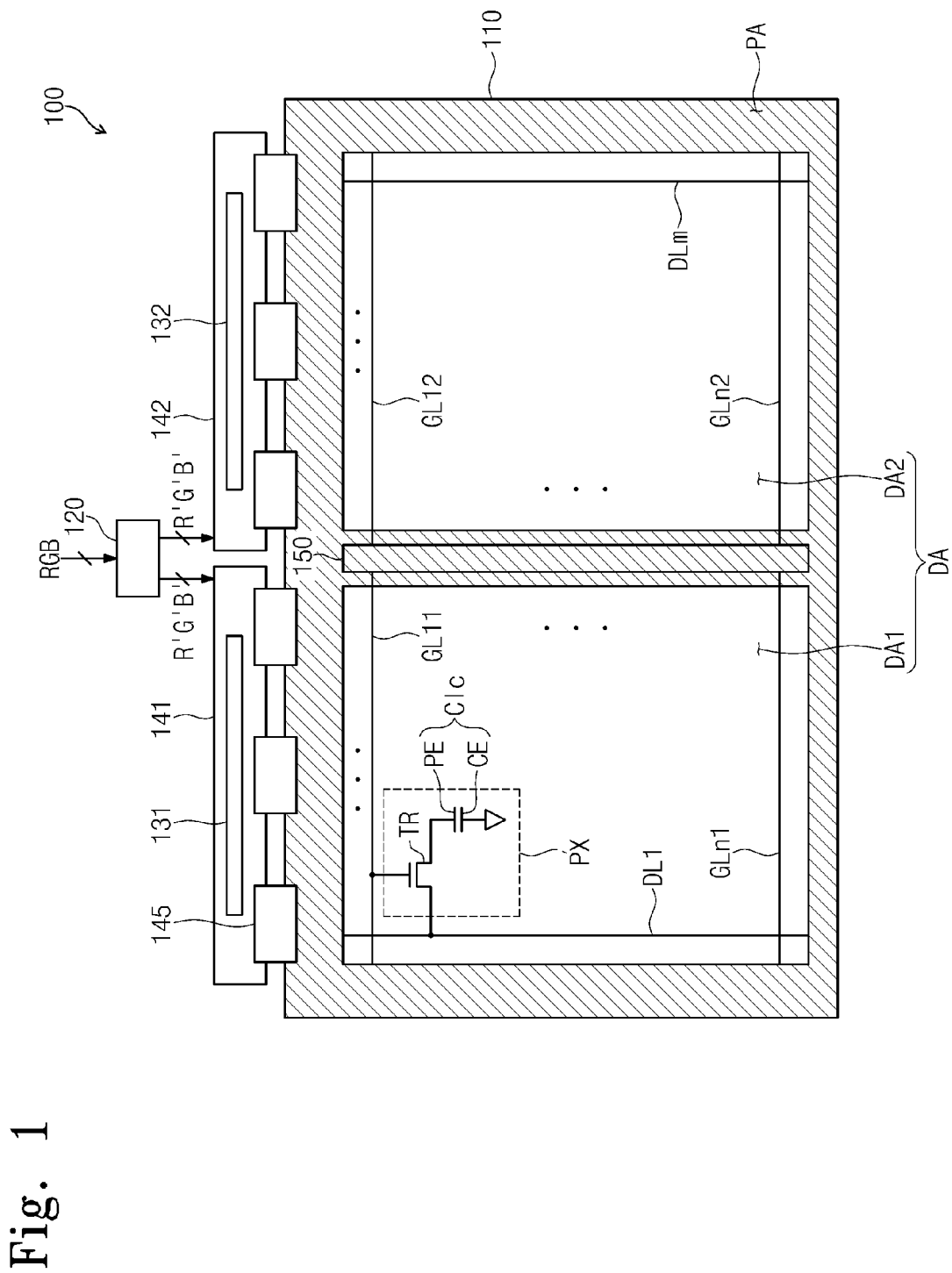
FIG. 1 is a plan view showing a display apparatus, according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a plan view showing a display apparatus 100, according to an exemplary embodiment of the present invention. Referring to FIG. 1, the display apparatus 100 includes a display panel 110, data drivers 131 and 132, a gate driver 150, and a timing controller 120.

The timing controller 120 receives an image signal RGB and a control signal (not shown) from an external device, and converts the image signal RGB into an image signal R'G'B' having a data format suitable for the data driver. The timing controller 120 provides the converted image signal R'G'B' to the data driver. Although not shown in FIG. 1, the timing controller 120 provides a data control signal, such as an output start signal, a horizontal start signal, etc., to the data driver. The timing controller 120 provides a gate control signal, such as a vertical start signal, a vertical clock signal, and a vertical clock bar signal, etc., to the gate driver 150.

The data driver changes the converted image signal R'G'B' into data voltages, in response to the data control signal provided from the timing controller 120. The data driver outputs the data voltages to the display panel 110.

The data driver includes a first data driver 131 disposed at an upper left side of the display panel 110 and a second data driver 132 disposed at an upper right side of the display panel 110. The first data driver 131 is disposed on a first printed circuit board 141 that is connected to the display panel 110 through a flexible printed circuit board 145. The second data driver 132 is disposed on a second printed circuit board 142 that is connected to the display panel 110 through the flexible printed circuit board 145.

In FIG. 1, the display apparatus 100 is shown to include the first printed circuit board 141 and the second printed circuit board 142, which are arranged separately from each other. However, the display apparatus 100 may include only one printed circuit board.

The first data driver 131 may include data driver ICs disposed on the first printed circuit board 141. The second data driver 132 may include data driver ICs disposed on the second printed circuit board 142.

The display panel 110 includes gate lines GL11 to GLn1 and GL12 to GLn2, data lines DL1 to DLm crossing the gate lines GL11 to GLn1 and GL12 to GLn2, and pixels PX. In the present exemplary embodiment, the pixels have the same structure and function. Thus, only one pixel PX will be described in detail.

Although not shown in figures, the display panel 110 may include a first substrate, a second substrate, and a liquid crystal layer. The first substrate includes the gate lines GL11 to GLn1 and GL12 to GLn2, the data lines DL1 to DLm, and a pixel electrode PE formed thereon. The second substrate faces the first substrate and includes a color filter formed thereon. The liquid crystal layer is disposed between the first substrate and the second substrate.

Each pixel PX includes a thin film transistor TR that is turned on in response to a gate signal applied through a corresponding gate line. The thin film transistor TR outputs a data voltage through a corresponding data line to the pixel electrode PE. Although not shown in FIG. 1, a common electrode CE is disposed facing the pixel electrode PE, with the liquid crystal layer disposed therebetween. the common electrode CE forms a liquid crystal capacitor C1c with the pixel electrode PE, thereby applying an electric field to the liquid crystal layer.

The gate lines GL11 to GLn1 and GL12 to GLn2 are connected to the gate driver 150, and the data lines DL1 to DLm are connected to the first and second data drivers 131 and 132. The gate lines GL11 to GLn1 and GL12 to GLn2 receive gate signals from the gate driver 150, and the data lines DL1 to DLm receive data voltages from the first and second data drivers 131 and 132.

The display panel 110 includes a display area DA in which the pixels PX are arranged and a non-display area PA disposed around the display area DA. The display area DA is divided into a first display area DA1 and a second display area DA2, which are disposed on opposing sides of the gate driver 150.

The gate lines GL11 to GLn1 and GL12 to GLn2 are sequentially arranged from upper to lower portions of the first and second display areas DA1 and DA2. The gate lines GL11 to GLn1 and GL12 to GLn2 are divided into first gate lines GL11 to GLn1 arranged in the first display area DA1, and second gate lines GL12 to GLn2 arranged in the second display area DA2. The data lines DL1 to DLm are sequentially arranged from a left to right in the first display area DA1 and the second display area DA2.

The gate driver 150 sequentially outputs the gate signal in response to the gate control signal supplied from the timing controller 120. However, according to embodiments, the gate control signal may be supplied from the driver ICs arranged in the first printed circuit board 141 or the second printed circuit board 142.

As shown in FIG. 1, the gate driver 150 is arranged in the non-display area PA, between the first and second display areas DA1 and DA2. The left side of the gate driver 150 is connected to the first gate lines GL11 to GLn1, and the right side of the gate driver 150 is connected to the second gate lines GL12 to GLn2.

The gate driver 150 substantially simultaneously applies the gate signal to corresponding ones of the first gate lines GL11 to GLn1 and the second gate lines GL12 to GLn2. Thus, when the gate driver 150 is arranged at a center portion of the display panel 110, a signal output from the gate driver 150 may be transmitted a relatively short distance, as compared to when the gate driver 150 is arranged at one end of the display panel 110. As such, the signal output from the gate driver 150 is prevented from being distorted. In addition, since the gate driver 150 does not need to be arranged at an end of the display panel 110, the non-display area PA corresponding to the end of the display panel 110 may be reduced.

Although not shown in figures, the display panel 110 may further include a coupling member arranged to couple the first substrate to the second substrate and seal the liquid crystal layer therebetween. In the present exemplary embodiment, the coupling member is not disposed in the area in which the gate driver 150 is arranged, thereby preventing a malfunction of the gate driver 150.

Figure 2:
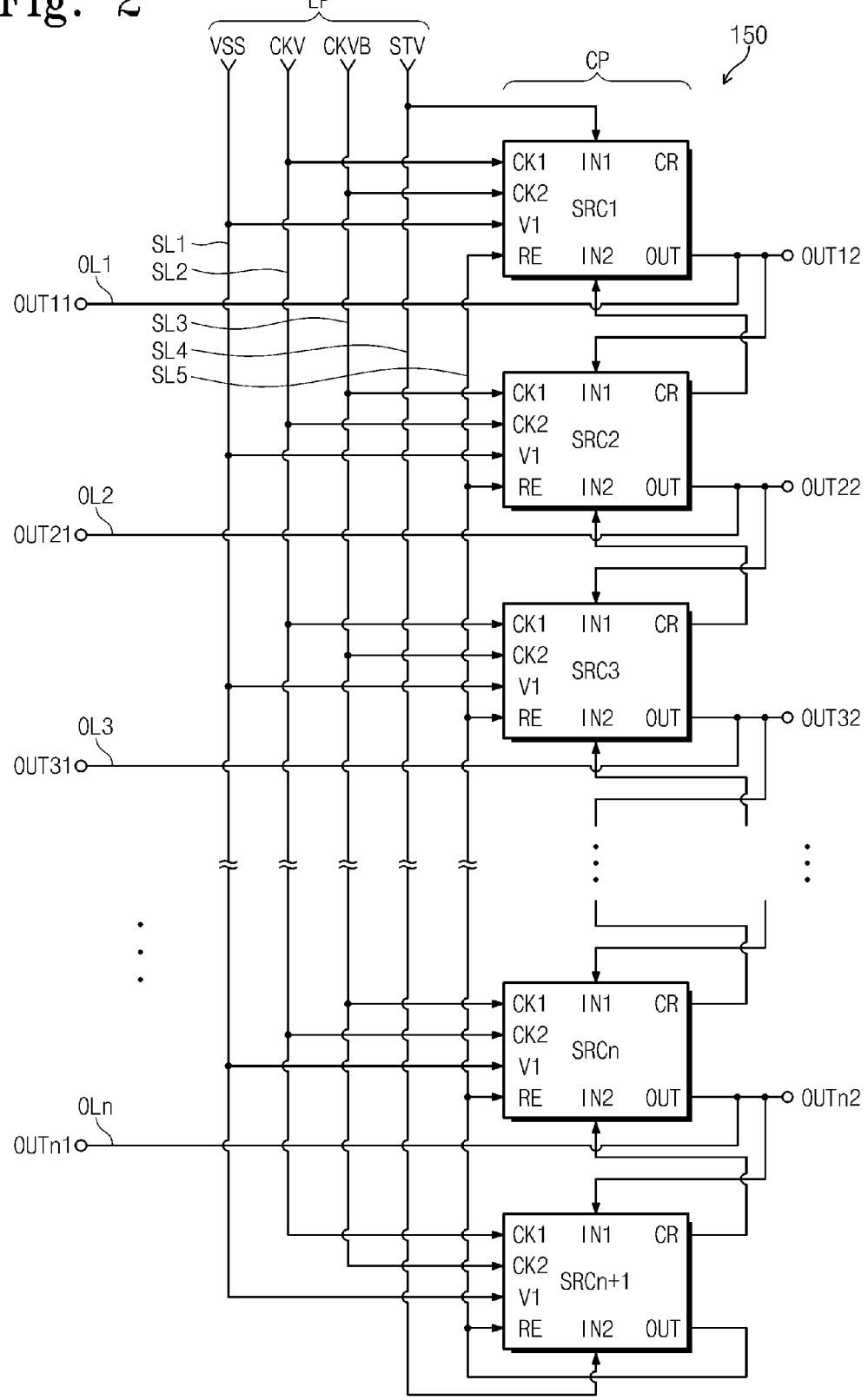
FIG. 2 is a block diagram showing a gate driver of FIG. 1, according to an exemplary embodiment of the present invention.

FIG. 2 is a block diagram showing the gate driver 150 of FIG. 1. Referring to FIG. 2, the gate driver 150 includes a circuit part CP and a line part LP arranged adjacent to the circuit part CP.

The circuit part CP includes first to (n+1)th stages SRC1 to SRCn+1 sequentially connected to one another, and the first to (n+1)th stages SRC1 to SRCn to sequentially output first to n-th gate signals through output terminals OUT thereof. Each of the first to (n+1)th stages SRC1 to SRCn+1 includes a first clock terminal CK1, a second clock terminal CK2, a first input terminal IN1, a second input terminal IN2, an off-voltage terminal V1, a reset terminal RE, a carry terminal CR, and the output terminal OUT.

A first clock signal CKV is supplied to the first clock terminals CK1 of odd-numbered stages SRC1, SRC3, . . . , SRCn+1, and a second clock signal CKVB having a different phase from the first clock signal CKV is supplied to the first clock terminals CK1 of even-numbered stages SRC2, . . . , SRCn. The second clock signal CKVB is supplied to the second clock terminals CK2 of the odd-numbered stages SRC1, SRC3, . . . , SRCn+1, and the first clock signal CKV is supplied to the second clock terminals CK2 of the even-numbered stages SRC2, . . . , SRCn.

A start signal STV or a gate signal of a previous stage is supplied to the first input terminals IN1 of the first to (n+1)th stages SRC1 to SRCn+1. In detail, the first input terminal IN1 of the first stage SRC1 receives the start signal STV, indicating a start of an operation of the circuit part CP. The first input terminal IN1 of each of the second to (n+1)th stages SRC2 to SRCn+1 receives the gate signal from the previous stage.

The second input terminal IN2 of each of the first to (n+1)th stages SRC1 to SRCn+1 is supplied with a carry signal from a subsequent stage. The (n+1)th stage SRCn+1 is a dummy stage to provide the carry signal to the second input terminal 1N2 of the n-th stage SRCn. Since no stage exists after the (n+1)th stage SRCn+1, the start signal STV is provided to the second input terminal IN2 of the (n+1)th stage SRCn+1, instead of the carry signal of the next stage.

An off voltage OFF is provided to the off-voltage terminals V1 of the first to (n+1)th stages SRC1 to SRCn+1. An (n+1)th gate signal output from the (n+1)th stage SRCn+1 is provided to the reset terminals RE of the first to (n+1)th stages SRC1 to SRCn+1.

The first clock signal CKV is output from the carry terminals CR and the output terminals OUT of the odd-numbered stages SRC1, SRC3, . . . , SRCn+1 as the gate signal. The second clock signal CKVB is output from the carry terminals CR and the output terminals OUT of the even-numbered stages SRC2, . . . , SRCn as the gate signal. The carry signal output from the carry terminals CR is provided to the second input terminals IN2 of previous stages. Each of the first to n-th gate signals is provided to the first input terminals IN1 of the subsequent stages.

The line part LP includes a first signal line SL1, a second signal line SL2, a third signal line SL3, a fourth signal line SL4, and a fifth signal line SL5. The first signal line SL1 receives the off voltage VSS from the timing controller 120. The second signal line SL2 receives the first clock signal CKV from the timing controller 120, and the third signal line SL3 receives the second clock signal CKVB from the timing controller 120. The fourth signal line SL4 provides the start signal STV from the timing controller 120 to the first input terminal IN1 of the first stage SRC1 and the second input terminal IN2 of the (n+1)th stage SRCn+1. The fifth signal line SL5 provides an (n+1)th gate signal output from the (n+1)th stage SRCn+1 to the reset terminals RE of each of the first to (n+1)th stages SRC1 to SRCn+1.

The fifth signal line SL5, the fourth signal line SL4, the third signal line SL3, the second signal line SL2, and the first signal line SL1 may be sequentially arranged adjacent to the circuit part CP. Thus, the first signal line SL1 may be disposed closer to the edge of the first display panel 110 than the second to fifth signal lines SL2 to SL5.

The output terminals OUT of the first to (n+1)th stages SRC1~SRCn+1 are connected to first output terminals OUT11 to OUTn1, each of which is connected to a corresponding first gate line GL11 to GLn1, and second output terminals OUT12 to OUTn2, each of which is connected to a corresponding second gate line GL12 to GLn2.

In detail, the gate driver 150 extends two adjacent stages and includes output lines OL1 to OLn crossing the first to fifth signal lines SL1 to SL5. The first gate lines GL11 to GLn1 or the second gate lines GL12 to SLn2 are connected to the first to (n+1)th stages SRC1 to SRCn+1 through the output lines OL1 to OLn. For example, when the first to fifth signal lines SL1 to SL5 are arranged on the same layer as the first and second gate lines GL11 to GLn1 and GL12 to GLn2, the output lines OL1 to OLn may be arranged on the same layer as the data lines DL1 to DLm or the pixel electrode PE, so as to be insulated from the first to fifth signal lines SL1 to SL5. When the first to fifth signal lines SL1 to SL5 are arranged on the same layer as the data lines DL1 to DLm, the output lines OL1 to OLn may be arranged on the same layer as the first and second gate lines GL11 to GLn1 and GL12 to GLn2 or the pixel electrode PE, so as to be insulated from the first to fifth signal lines SL1 to SL5. When the first to fifth signal lines SL1 to SL5 are arranged on the same layer as the pixel electrode PE, the output lines OL1 to OLn may be arranged on the same layer as the data lines DL1 to DLm or the first and second gate lines GL11 to GLn1 and GL12 to GLn2, so as to be insulated from the first to fifth signal lines SL1 to SL5.

In FIG. 2, the first gate lines GL11 to GLn1 are connected to the first to (n+1)th stages SRC1 to SRCn+1 through the output lines OL1 to OLn. The gate signals output from the output terminals OUT of the first to (n+1)th stages SRC1 to SRCn+1 are input to the first gate lines GL11 to GLn1 through the first output terminals OUT11 to OUTn1 and are input to the second gate lines GL12 to GLn2 through the second output terminals OUT12 to OUTn2. Therefore, each of the first gate lines GL11 to GLn1 is supplied with the same gate signal as a corresponding second gate line GL12 to GLn2.

Although not shown in figures, when the first to fifth signal lines SL1 to SL5 are arranged on the same layer as the first to second gate lines GL11 to GLn1 and GL12 to GLn2, each of the output lines OL1 to OLn may be arranged between adjacent stages SRC1 to SRCn+1, so as to be disposed on the same layer as the data lines DL1 to DLm.

Figure 3:
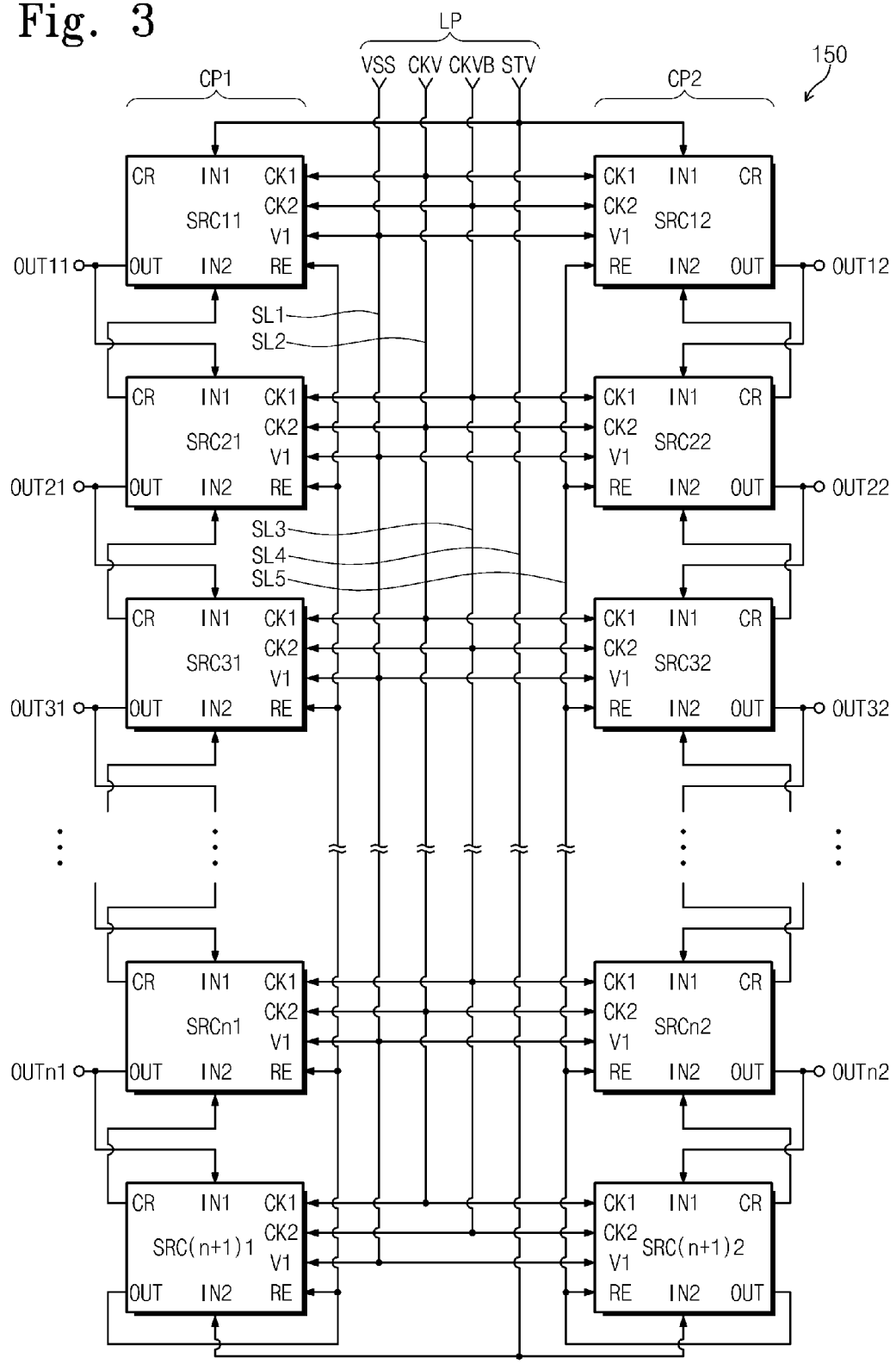
FIG. 3 is a block diagram showing a gate driver of FIG. 1, according to another exemplary embodiment of the present invention.

FIG. 3 is a block diagram showing the gate driver 150 of FIG. 1. Referring to FIG. 3, the gate driver 150 includes a line part LP, a first circuit part CP1 disposed adjacent to the left side of the line part LP, and a second circuit part CP2 disposed adjacent to the right side of the line part LP.

The first circuit part CP1 includes first to (n+1)th stages SRC11 to SRC(n+1)1 that are sequentially connected one another. Output terminals OUT of the first to (n+1)th stages SRC11 to SRCn1 are connected to first gate lines GL11 to GLn1, to sequentially output first to n-th gate signals. The second circuit part CP2 includes first to (n+1)th stages SRC12 to SRC(n+1)2 sequentially connected one another. Output terminals OUT of the first to (n+1)th stages SRC12 to SRCn2 are connected to second gate lines GL12 to GLn2, to sequentially output first to n-th gate signals.

The first and second circuit parts CP1 and CP2 may be symmetrically arranged with reference to the line part LP. In addition, each of the first to (n+1)th stages SRC11 to SRC(n+1)1 of the first circuit part CP1 has the same structure and function as a corresponding one of the first to (n+1)th stages SRC12 to SRC(n+1)2 of the second circuit part CP2. Thus, each of the first gate lines GL11 to GLn1 is supplied with the same signal as a corresponding one of the second gate lines GL12 to GLn2.

In detail, the first stage SRC11 of the first circuit part CP1 has the same structure and function as the first stage SRC12 of the second circuit part CP2. An off-voltage terminal V1, a first clock terminal CK1, a second clock terminal CK2, and a first input terminal IN1 of the first stage SRC11 are supplied with the same signals from the first to fourth signal lines SL1 to SL4, as an off-voltage terminal V1, a first clock terminal CK1, a second clock terminal CK2, and a first input terminal IN1 in the first stage SRC12. Thus, the first gate line GL11 of the first display area DA1 and the first gate line GL12 of the second display area DA2 receive the same gate signal from the first stage SRC11 and the first stage SRC12.

Figure 4:
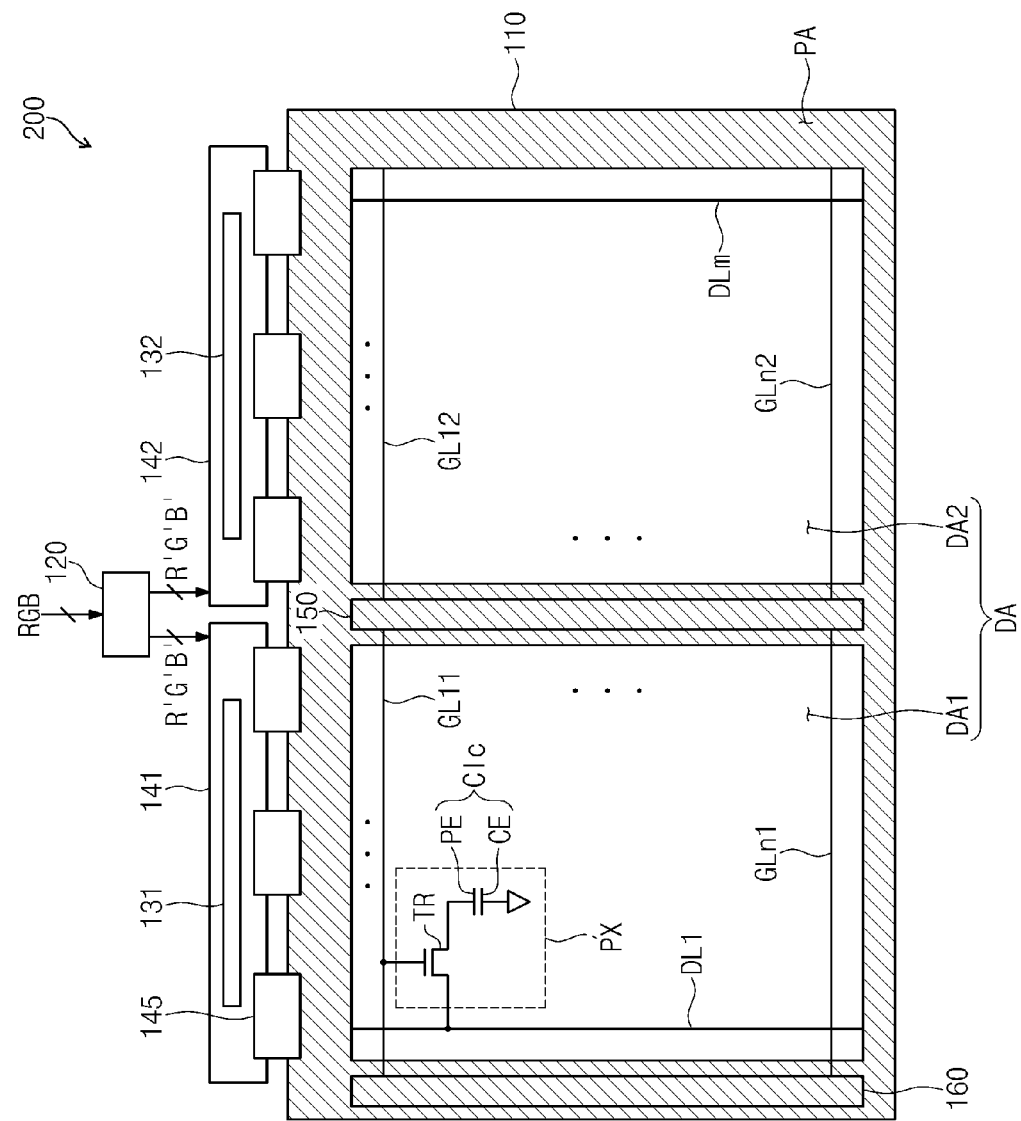
FIG. 4 is a plan view showing a display apparatus, according to another exemplary of the present invention.

FIG. 4 is a plan view showing a display apparatus 200, according to another exemplary of the present invention. Referring to FIG. 4, the display apparatus 200 includes a first gate driver 150 disposed between a first display area DA1 and a second display area DA2. A second gate driver 160 is positioned at the left side of the first display area DA1. The first display area DA1 is disposed between the first gate driver 150 and the second gate driver 160.

The first gate driver 150 and the second gate driver 160 are formed on a display panel 110 through a thin film process. The first gate driver 150 is connected to second gate lines GL12 to GLn2, and the second gate driver 160 is connected to first gate lines GL11 to GLn1. However, the first gate driver 150 may also be connected to the first gate lines GL11 to GLn1.

Figure 5:
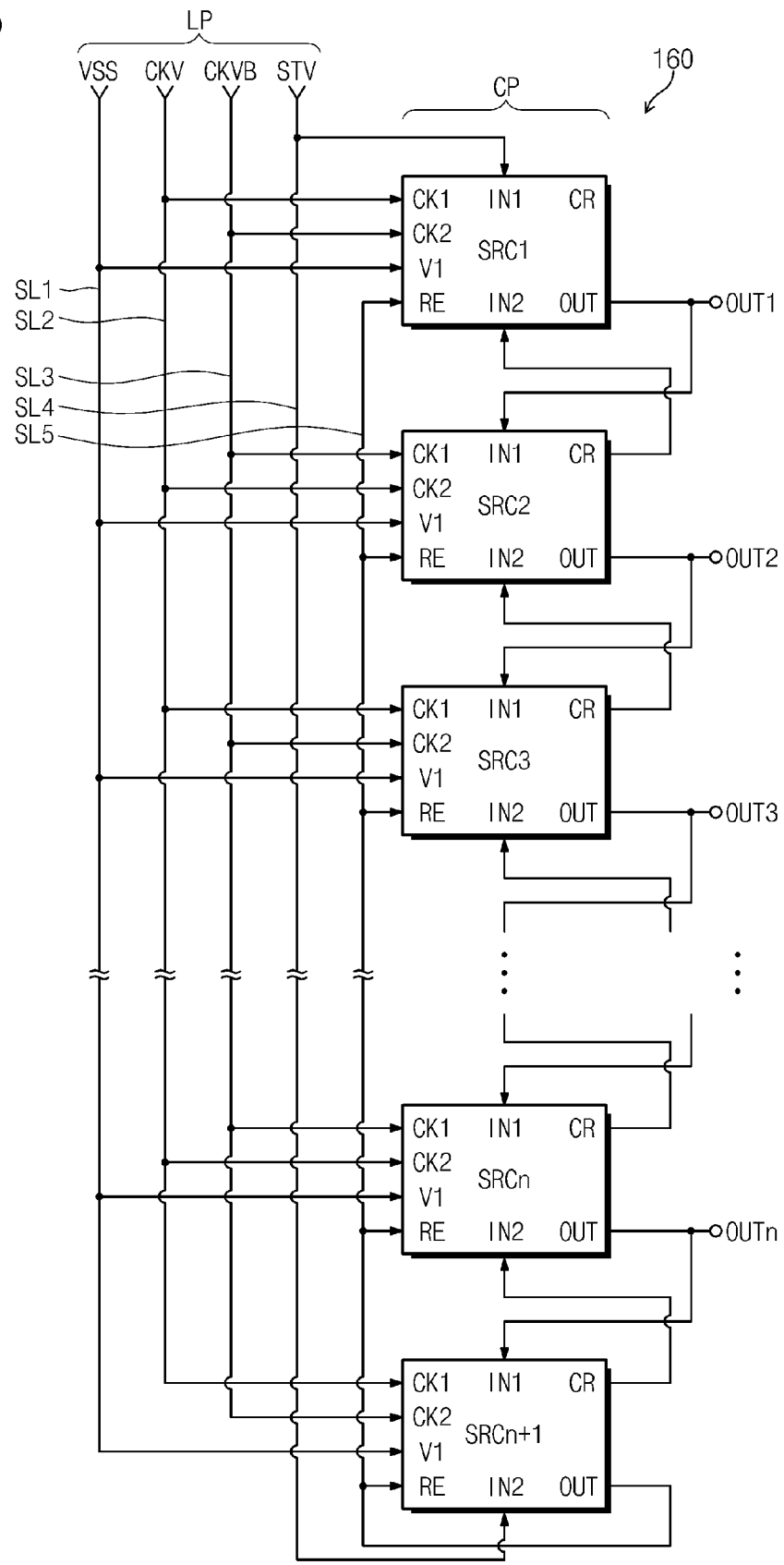
FIG. 5 is a block diagram showing a second gate driver of FIG. 4.

FIG. 5 is a block diagram showing the second gate driver 160 of FIG. 4. Referring to FIG. 5, the second gate driver 160 includes a circuit part CP and a line part LP arranged adjacent to the circuit part CP. The circuit part CP includes first to (n+1)th stages SRC1 to SRCn+1 sequentially connected one another, and the first to n-th stages SRC1 to SRCn sequentially output first to n-th gate signals through output terminals OUT thereof.

The line part LP includes a first signal line SL1, a second signal line SL2, a third signal line SL3, a fourth signal line SL4, and a fifth signal line SL5. The output terminals OUT of the first to n-th stages SRC1 to SRCn are respectively connected to first output terminals OUT1 to OUTn, each of which is connected to a corresponding one of the first gate lines GL11 to GLn1.

The gate signals output from the output terminals OUT of the first to n-th stages SRC1 to SRCn are supplied to the respective first gate lines GL11 to GLn1, through the first output terminals OUT1 to OUTn. If the first gate driver 150 is connected to the first gate lines GL11 to GLn1, a stage of the first gate driver 150 and a stage of the second gate driver 160, which are connected to a corresponding gate line, output the same gate signal.

Figure 6:
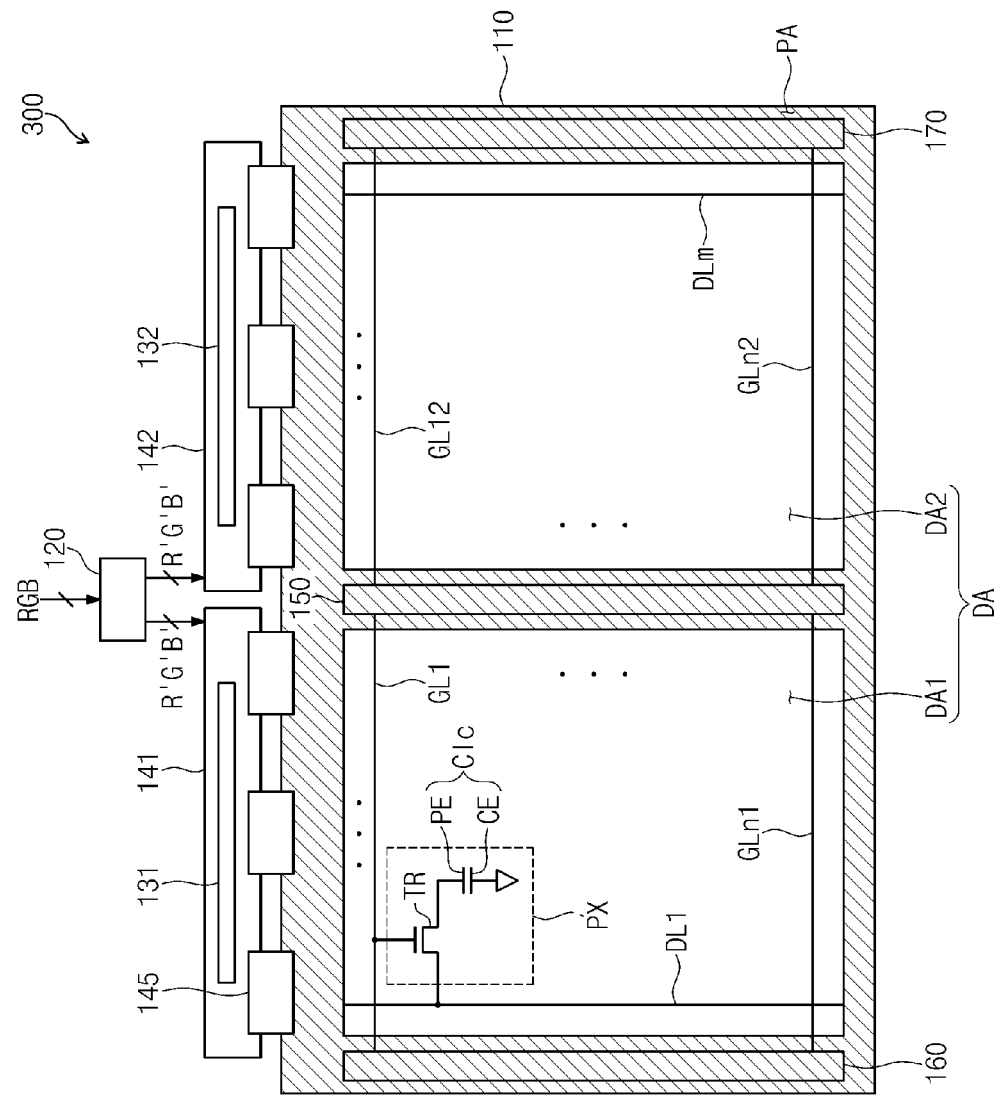
FIG. 6 is a plan view showing a display apparatus, according to another exemplary embodiment of the present invention.

FIG. 6 is a plan view showing a display apparatus 300, according to another exemplary embodiment of the present invention. Referring to FIG. 6, the display apparatus 300 includes a first gate driver 150 disposed between a first display area DA1 and a second display area DA2, a second gate driver 160 positioned at the left side of the first display area DA1, such that the first display area DA is positioned between the first and second gate drivers 150 and 160, and a third gate driver 170 positioned at the right side of the second display area DA2, such that the second display area DA2 is positioned between the first and third gate drivers 150 and 170.

The first, second, and third gate drivers 150, 160, and 170 are formed on the display panel 110 through a thin film process. The first gate driver 150 is connected to first gate lines GL11 to GLn1 and second gate lines GL12 to GLn2, the second gate driver 160 is connected to the first gate lines GL11 to GLn1, and the third gate driver 170 is connected to the second gate lines GL12 to GLn2.

The first gate lines GL11 to GLn1 receive the same signal from the first gate driver 150 and the second gate driver 160, and the second gate lines GL12 to GLn2 receive the same signal from the first gate driver 150 and the third gate driver 170. As described above, the same gate signal is supplied to corresponding ones of the first gate lines GL11 to GLn1 and the second gate lines GL12 to GLn2, so distortion of the gate signal may be prevented.

In FIG. 6, the second gate driver 160 and the third gate driver 170 are formed in the display panel 110 through the thin film process. However, the second and third gate drivers 160 and 170 may be integrated and mounted on the display panel 110, in the form of a gate driver IC chip.

Figure 7:
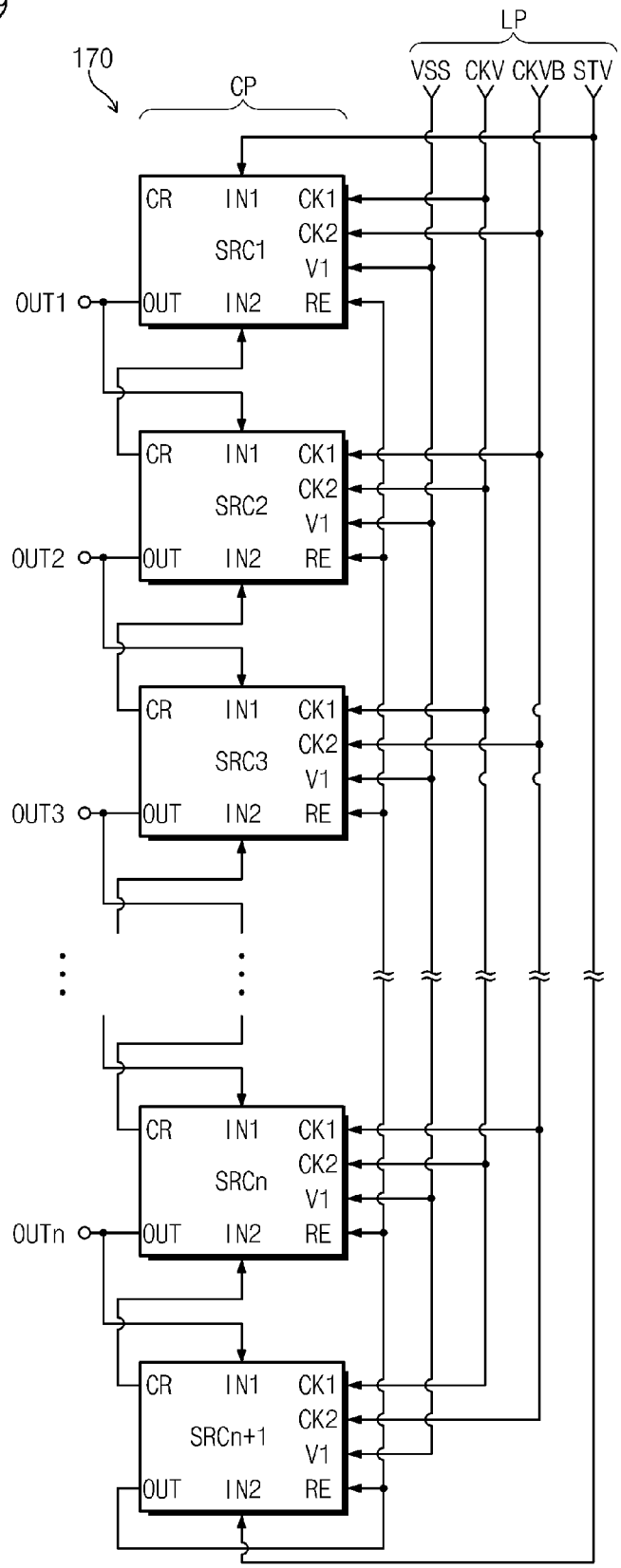
FIG. 7 is a block diagram showing a third gate driver of FIG. 6.

FIG. 7 is a block diagram showing the third gate driver 170 of FIG. 6. Referring to FIG. 7, the third gate driver 170 includes a circuit part CP and a line part LP arranged adjacent to the circuit part CP. The circuit part CP includes first to (n+1)th stages SRC1 to SRCn+1 that are sequentially connected to one another, and the first to n-th stages SRC1 to SRCn that sequentially output first to n-th gate signals through output terminals OUT thereof.

The line part LP includes a first signal line SL1, a second signal line SL2, a third signal line SL3, a fourth signal line SL4, and a fifth signal line SL5. The output terminals OUT of the first to n-th stages SRC1 to SRCn are connected to first output terminals OUT1 to OUTn, each of which is connected to a corresponding one of the second gate lines GL12 to GLn2.

The gate signals output from the output terminals OUT are supplied to the second gate lines GL12 to GLn2 through the first output terminals OUT1 to OUTn. Since the first gate driver 150 is connected to the second gate lines GL12 to GLn2, a stage of the first gate driver 150 and a stage of the third gate driver 170, which are connected to the corresponding gate line, output the same gate signal.

Figure 8:
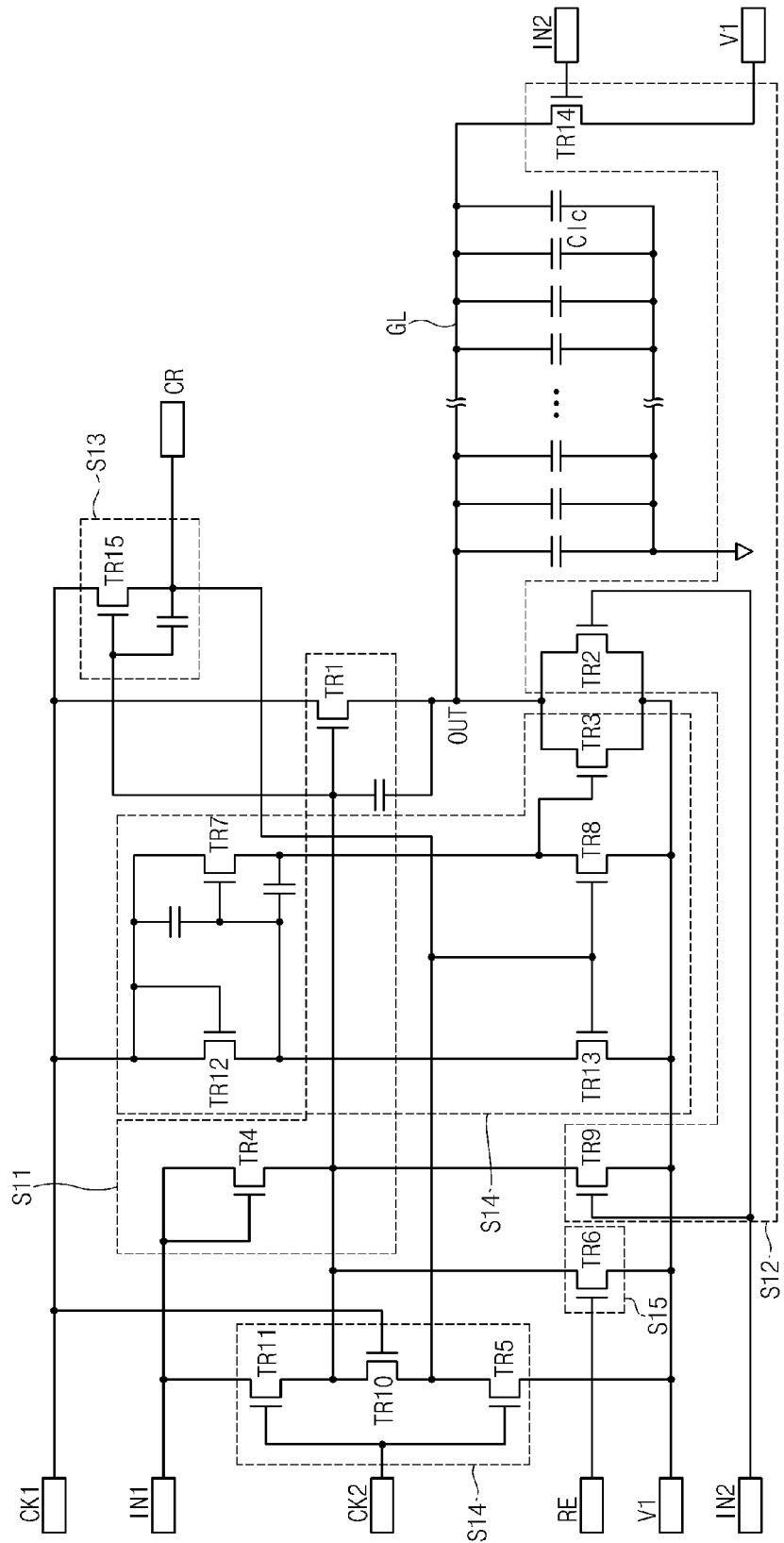
FIG. 8 is a circuit diagram showing a stage of FIG. 2, 3, 5, or 7.

FIG. 8 is a circuit diagram showing a stage of FIG. 2, 3, 5, or 7. Referring to FIG. 8, the stage includes a pull-up driver part S11, a pull-down driver part S12, a carry part S13, a ripple control part S14, and a frame reset part S15.

The pull-up driver part S11 includes a first transistor TR1 and a fourth transistor TR4. The first transistor TR1 includes a source electrode electrically connected to a corresponding gate line GL, a gate electrode electrically connected to a source electrode of the fourth transistor TR4, and a drain electrode supplied with a signal input to the first clock terminal CK1.

The fourth transistor TR4 includes a drain electrode and a gate electrode, which are connected to each other to serve as a diode. The drain electrode and the gate electrode of the fourth transistor TR4 receive a start signal STV or a carry signal of a previous stage.

The pull-down driver part S12 includes a second transistor TR2, a ninth transistor TR9, and a fourteenth transistor TR14. The second transistor TR2 includes a gate electrode supplied with a gate signal of a subsequent stage, a source electrode supplied with the off voltage VSS, and a drain electrode electrically connected to the gate line GL.

The ninth transistor TR9 includes a gate electrode supplied with the gate signal of the next stage, a source electrode supplied with the off voltage VSS, and a drain electrode electrically connected to the gate electrode of the first transistor TR1. The fourteenth transistor TR14 includes a source electrode to receive the off voltage VSS, and a drain electrode electrically connected to the gate line GL. The first and second transistors TR1 and TR2 are connected to one end of a corresponding gate line, and the fourteenth transistor TR14 is connected to the other end of the corresponding gate line. The fourteenth transistor TR14 receives the gate signal of the subsequent stage, through a gate electrode thereof.

The carry part S13 includes a fifteenth transistor TR15. The fifteenth transistor TR15 includes a gate electrode and a drain electrode that are respectively connected to the gate electrode and the drain electrode of the first transistor TR1. A carry signal output from a source electrode of the fifteenth transistor TR15 is the same as the gate signal output from the source electrode of the first transistor TR1. The source electrode of the fifteenth transistor TR1 is electrically connected to the gate and drain electrodes of the fourth transistor TR4 of a subsequent stage. Thus, the carry signal is supplied to the gate and drain electrodes of the fourth transistor TR4 of the subsequent stage.

The ripple control part S14 includes a third transistor TR3, a fifth transistor TR5, a seventh transistor TR7, an eighth transistor TR8, a tenth transistor TR10, an eleventh transistor TR11, a twelfth transistor TR12, and a thirteenth transistor TR13. Source and drain electrodes of the third transistor TR3 are electrically connected to the drain and source electrodes of the second transistor TR2, respectively. The third transistor TR3 includes a gate electrode electrically connected to a drain electrode of the eighth transistor TR8.

The fifth transistor TR5 includes a gate electrode supplied with a signal input to the second clock terminal CK2, a source electrode supplied with the off voltage VSS, and a drain electrode electrically connected to the source electrode of the fifteenth transistor TR15. The seventh transistor TR7 includes a gate electrode and a drain electrode, which receive a signal input to the first clock terminal CK1, and a source electrode electrically connected to the drain electrode of the eighth transistor TR8.

The eighth transistor TR8 includes the drain electrode electrically connected to the source electrode of the seventh transistor TR7 and the gate electrode of the third transistor TR3. In addition, the eighth transistor TR8 includes a source electrode supplied with the off voltage VSS and a gate electrode electrically connected to a gate electrode of the thirteenth transistor TR13, the source electrode of the fifteenth transistor TR15, and the drain electrode of the fifth transistor TR5.

The tenth transistor TR10 includes a gate electrode that receives a signal input to the first clock terminal CK1, and a drain electrode electrically connected to the drain electrode of the fifth transistor TR5, the gate electrode of the eighth transistor TR8, a gate electrode of the thirteenth transistor TR13, and the source electrode of the fifteenth transistor TR15. The tenth transistor TR10 includes a source electrode electrically connected to a source electrode of the eleventh transistor TR11, a drain electrode of a sixth transistor TR6, the drain electrode of the ninth transistor TR9, the source electrode of the fourth transistor TR4, the gate electrode of the first transistor TR1, and the gate electrode of the fifteenth transistor TR15.

The eleventh transistor TR11 includes a gate electrode that receives a signal input to the second clock terminal CK2, and a source electrode electrically connected to the source electrode of the tenth transistor TR10, the drain electrode of the sixth transistor TR6, the drain electrode of the ninth transistor TR9, the gate electrode of the first transistor TR1, and the gate electrode of the fifteenth transistor TR15. The eleventh transistor TR11 includes a drain electrode supplied with the start signal STV or the carry signal of the previous stage.

The twelfth transistor TR12 includes a gate electrode and a source electrode, which are supplied with a signal input to the first clock terminal CK1. The twelfth transistor TR12 includes a drain electrode electrically connected to the source electrode of the thirteenth transistor TR13, the source electrode of the seventh transistor TR7, and the drain electrode of the eighth transistor TR8.

The thirteenth transistor TR13 includes a drain electrode supplied with the off voltage VSS, and a source electrode electrically connected to the drain electrode of the twelfth transistor TR12, the source electrode of the seventh transistor TR7, and the drain electrode of the eighth transistor TR8. The thirteenth transistor TR13 includes a gate electrode that is electrically connected to the gate electrode of the eighth transistor TR8 and the source electrode of the fifteenth transistor TR15.

The frame reset part S15 includes the sixth transistor TR6. The sixth transistor TR6 includes a gate electrode supplied with a gate signal from a last stage, and a drain electrode electrically connected to the source electrode of the fourth transistor TR4 and the gate electrode of the first transistor TR1. In addition, the sixth transistor TR6 includes a source electrode supplied with the off voltage VSS.

When the gate signal from the last stage is supplied to the sixth transistor TR6, the sixth transistor TR6 is turned on. Accordingly, the off voltage VSS is supplied to the gate electrode of the first transistor TR1, to thereby reset all stages.

The first to fifteenth transistors TR1~TR15 may include amorphous silicon, polysilicon, or oxide semiconductor. If the thin film transistors arranged in the first and second display areas DA1 and DA2 include the amorphous silicon, the first to fifteenth transistors TR1~TR15 may include the amorphous silicon. However, the present invention is not limited thereto. That is, the first to fifteenth transistors TR1~TR15 may include the polysilicon or the oxide semiconductor. When the first to fifteenth transistors TR1~TR15 include the polysilicon or the oxide semiconductor, an integration rate of the transistors per unit area may be increased, thereby reducing the area in which one stage is formed.

Figure 9:
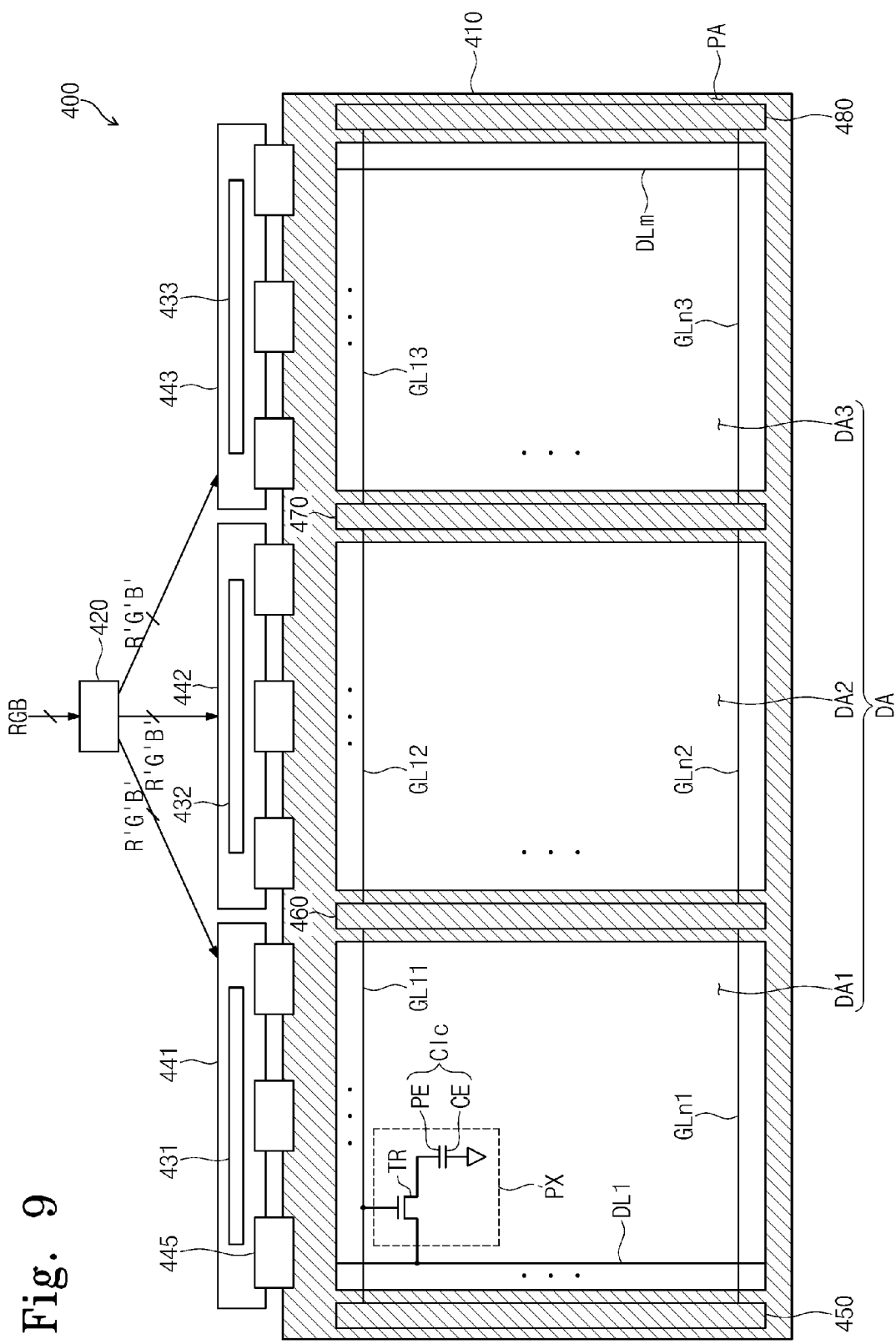
FIG. 9 is a plan view showing a display apparatus, according to another exemplary embodiment of the present invention.

FIG. 9 is a plan view showing a display apparatus 400, according to another exemplary embodiment of the present invention. Referring to FIG. 9, the display apparatus 400 includes a timing controller 420 that receives an image signal RGB and a control signal (not shown) from an external device. The timing controller 420 converts the image signal RGB into an image signal R'G'B' having a data format suitable for a data driver, and provides the converted image signal R'G'B' to the data driver.

The data driver changes the converted image signal R'G'B into data voltages, in response to a data control signal provided from the timing controller 420, to output the data voltages. The data voltages output from the data driver are supplied to a display panel 410.

The data driver includes a first data driver 431 disposed on an upper left portion of the display panel 410, a second data driver 432 disposed on an upper center portion of the display panel 410, and a third data driver 433 disposed on an upper right portion of the display panel 410. The first data driver 431 is disposed on a first printed circuit board 441 connected to the display panel 410 through a flexible printed circuit board 445. The second data driver 432 is disposed on a second printed circuit board 442 connected to the display panel 410 through the flexible printed circuit board 445. The third data driver 433 is disposed on a third printed circuit board 443 connected to the display panel 410 through the flexible printed circuit board 445.

In FIG. 9, the display apparatus 400 includes the first printed circuit board 441, the second printed circuit board 442, and the third printed circuit board 443, which are separated from each other. However, the display apparatus 400 may include only one printed circuit board, instead of the first, second, and third printed circuit board 441, 442, and 443.

The display panel 410 includes a display area DA, in which pixels PX are arranged, and a non-display area PA surrounding the display area DA. The display area DA is divided into a first display area DA1, a second display area DA2, and a third display area DA3, which are arranged sequentially from left to right on the display panel 410.

Gate lines GL11 to GLn1, GL12 to GLn2, and GL13 to GLn3 are sequentially arranged from top to bottom on the first to third display areas DA1 to DA3. The gate lines GL11 to GLn1, GL12 to GLn2, and GL13 to GLn3 include first gate lines GL11 to GLn1 arranged in the first display area DA1, second gate lines GL12 to GLn2 arranged in the second display area DA2, and third gate lines GL13 to GLn3 arranged in the third display area DA3. Data lines DL1 to DLm are sequentially arranged from the left to right on the first to third display areas DA1 to DA3.

As shown in FIG. 9, the display apparatus 400 includes a first gate driver 450, a second gate driver 460, a third gate driver 470, and a fourth gate driver 480. The first to fourth gate drivers 450, 460, 470, and 480 are sequentially arranged from the left to the right on the display panel 410 and are formed in the non-display area PA, through a thin film process.

The first gate driver 450 is connected to left ends of the first gate lines GL11 to GLn1. The second gate driver 460 is connected to right ends of the first gate lines GL11 to GLn1 and left ends of the second gate lines GL12 to GLn2. The third gate driver 470 is connected to right ends of the second gate lines GL12 to GLn2 and left ends of the third gate lines GL13 to GLn3. The fourth gate driver 480 is connected to right ends of the third gate lines GL13 to GLn3.

The first and second gate drivers 450 and 460 apply the same signal to the first gate lines GL11 to GLn1, the second and third gate drivers 460 and 470 apply the same signal to the second gate lines GL12 to GLn2, and the third and fourth gate drivers 470 and 480 apply the same signal to the third gate lines GL13 to GLn3. Thus, the gate signal may be prevented from being distorted due to being transmitted over a relatively long distance.

According to some embodiments, the first and fourth gate drivers 450 and 480 may be omitted from the display apparatus 400. In such a case, the display apparatus 400 may include a chassis having a relatively narrower width, as compared to the display apparatus 400 including the first and fourth gate drivers 450 and 480.

According to some embodiments, the display apparatus 400 may include more than four gate drivers, thereby dividing the display area into three or more display areas. When the display area is divided into more than three display areas, the gate driver may not be positioned on left and right edge portions of the non-display area, in order to reduce the width of the chassis.

Figure 10:
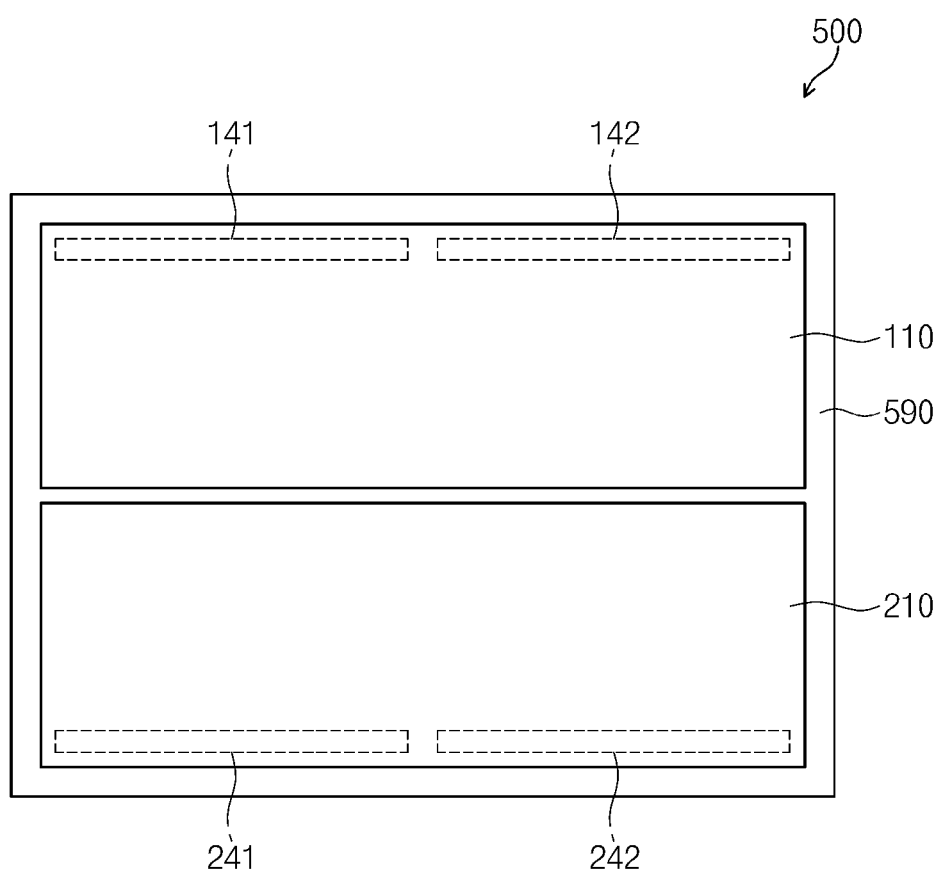
FIG. 10 is a plan view showing a display set, according to an exemplary embodiment of the present invention.

FIG. 10 is a plan view showing a display set 500, according to an exemplary embodiment of the present invention. At least two of the display apparatuses shown in FIGS. 1, 4, 6, and 9 may be combined to form a display set, e.g., a digital information display.

Referring to FIG. 10, the display set 500 includes two display apparatuses assembled to each other in a column direction. However, the display set 500 may include a plurality of display apparatuses arranged in a matrix.

The display set 500 includes a first display panel 110 and a second display panel 210. The first and second display panels 110 and 210 are coupled to each other by a chassis 590. The first display panel 110 is connected to first and second printed circuit boards 141 and 142 disposed adjacent to an upper portion of the first display panel 110, through a flexible printed circuit board (not shown). The first and second printed circuit boards 141 and 142 are arranged on a rear surface of the first display panel 110.

The second display panel 210 is connected to third and fourth printed circuit boards 241 and 242 disposed adjacent to a lower portion of the second display panel 210, through a flexible printed circuit board (not shown). The third and fourth printed circuit boards 241 and 242 are arranged on a rear surface of the second display panel 210.

As shown in FIG. 10, an end portion of the first display panel 110, where the flexible printed circuit board is not attached, is disposed adjacent to an end portion of the second display panel 210, where the flexible printed circuit board is not attached. Non-display areas of the first and second display panels 110 and 210, in which the flexible printed circuit board is not attached, may be narrower than non-display areas where the flexible printed circuit board is attached. Thus, the width of the chassis 590 between the first and second display panels 110 and 210 may be decreased, by disposing the end portions of the first and second display panels 110 and 210, in which the flexible printed circuit board is not attached, adjacent to each other.

Figure 11:
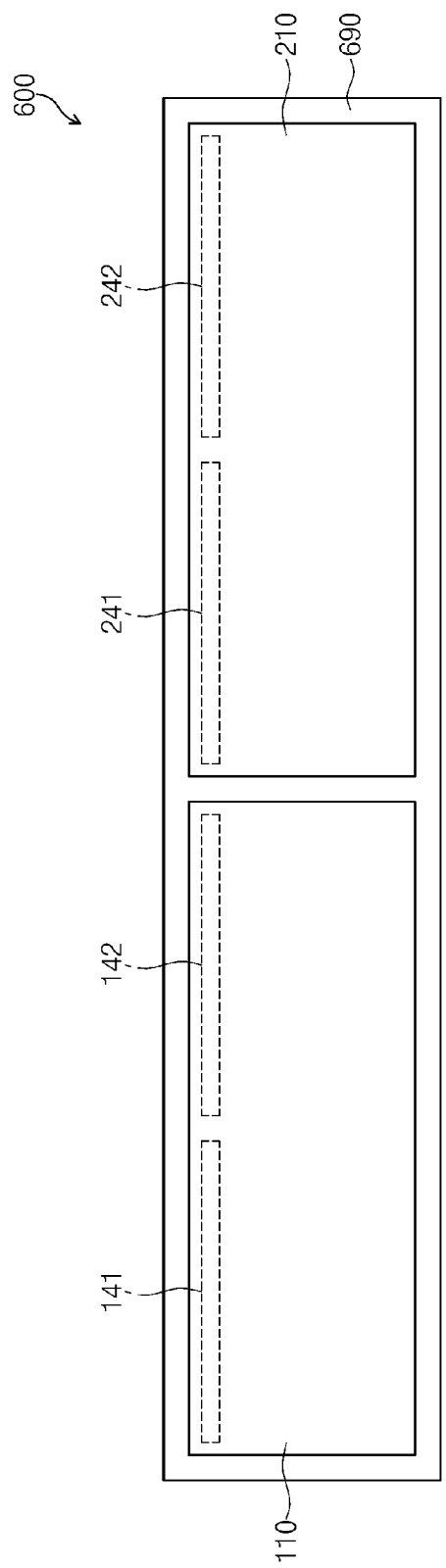
FIG. 11 is a plan view showing a display set, according to another exemplary embodiment of the present invention.

FIG. 11 is a plan view showing a display set 600, according to another exemplary embodiment of the present invention. Referring to FIG. 11 the display set 600 includes a first display panel 110 and a second display panel 210, which are coupled to each other by a chassis 690.

The first display panel 110 is connected to first and second printed circuit boards 141 and 142 disposed adjacent to an upper portion of the first display panel 110, through a flexible printed circuit board (not shown). The first and second printed circuit boards 141 and 142 are arranged on a rear surface of the first display panel 110.

The second display panel 210 is connected to third and fourth printed circuit boards 241 and 242 disposed adjacent to an upper portion of the second display panel 210, through a flexible printed circuit board (not shown). The third and fourth printed circuit boards 241 and 242 are arranged on a rear surface of the second display panel 210.

As shown in FIG. 11, a side portion of the first display panel 110 is disposed adjacent to a side portion of the second display panel 210. The width of the chassis 690 may be reduced between the first and second display panels 110 and 210, since gate drivers are not disposed therein.

Figure 12:
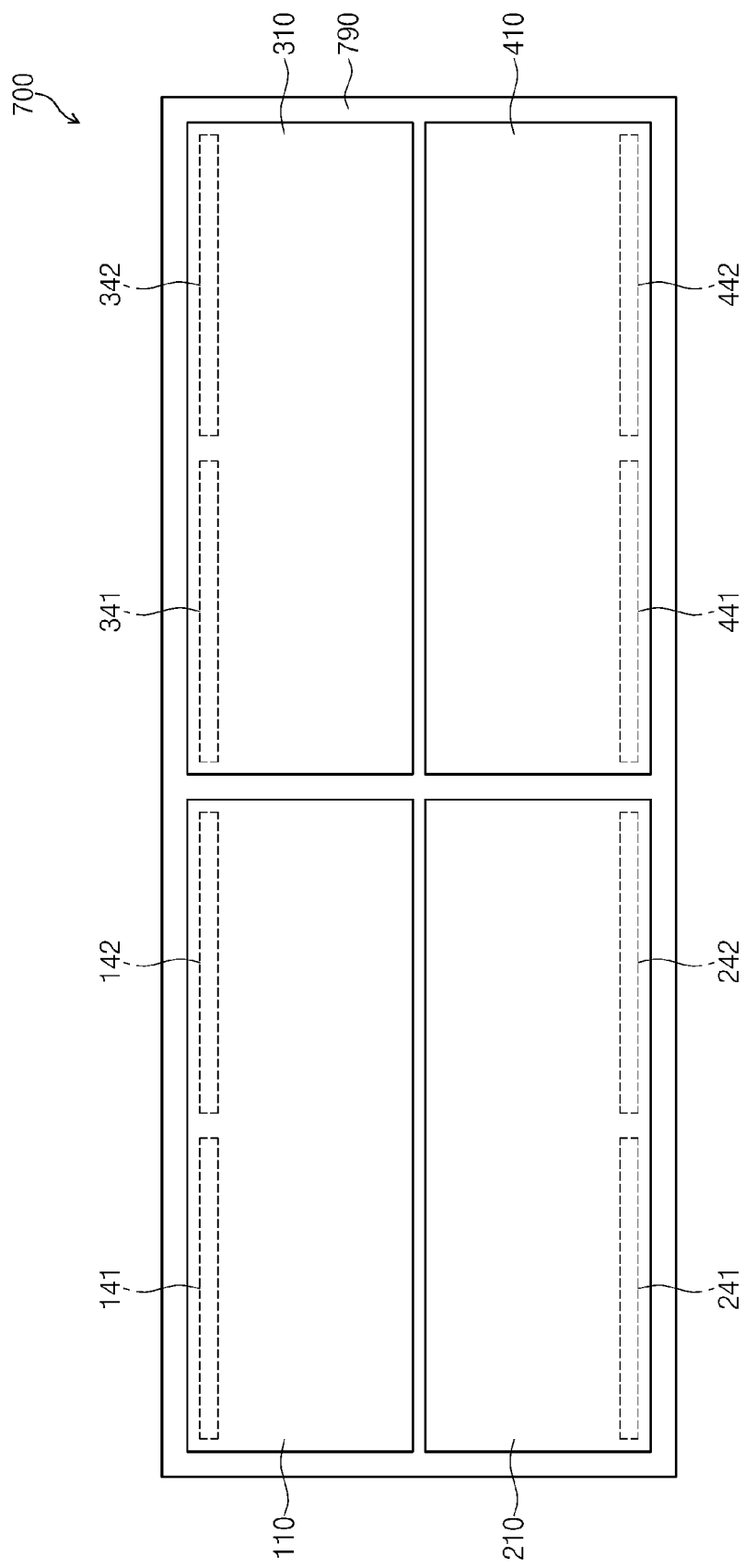
FIG. 12 is a plan view showing a display set, according to another exemplary embodiment of the present invention.

FIG. 12 is a plan view showing a display set 700, according to another exemplary embodiment of the present invention. Referring to FIG. 12, the display set 700 includes a first display panel 110, a second display panel 210, a third display panel 310, and a fourth display panel 410, which are arranged in a matrix. The first to fourth display panels 110, 210, 310, and 410 are coupled by a chassis 790.

The first display panel 110 is connected to first and second printed circuit boards 141 and 142 disposed adjacent to an upper portion of the first display panel 110, through a flexible printed circuit board (not shown). The first and second printed circuit boards 141 and 142 are arranged on a rear surface of the first display panel 110.

The second display panel 210 is connected to third and fourth printed circuit boards 241 and 242 disposed adjacent to a lower portion of the second display panel 210, through a flexible printed circuit board (not shown). The third and fourth printed circuit boards 241 and 242 are arranged on a rear surface of the second display panel 210.

The third display panel 310 is connected to fifth and sixth printed circuit boards 341 and 342 disposed adjacent to an upper portion of the third display panel 310, through a flexible printed circuit board (not shown). The fifth and sixth printed circuit boards 341 and 342 are arranged on a rear surface of the third display panel 310.

The fourth display panel 410 is connected to seventh and eighth printed circuit boards 441 and 442 disposed adjacent to a lower portion of the fourth display panel 410, through a flexible printed circuit board (not shown). The seventh and eighth printed circuit boards 441 and 442 are arranged on a rear surface of the fourth display panel 410.

As shown in FIG. 12, gate drivers are not disposed between the first to fourth display panels 110, 210, 310, and 410. As such, the first to fourth display panels 110, 210, 310, and 410 can be disposed closer together, thereby reducing the size of the display set 700.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display apparatus comprising:
a substrate comprising a first display area, a second display area, and a non-display area disposed around the first and second display areas;
first gate lines disposed in the first display area;
second gate lines disposed in the second display area;
data lines disposed in the first and second display areas and extending across the first and second gate lines;
pixels disposed in the first and second display areas and connected to the first and second gate lines and the first and second data lines;
a first gate driver disposed in the non-display area, between the first and second display areas, and configured to output gate signals; and
a second gate driver disposed at a first edge of the substrate and facing the first gate driver, wherein,
the first gate driver comprises:
first stages that are each configured to output gate signals to different ones of the first gate lines; and
a first signal line to apply a clock signal to the first stages; and
the second gate driver comprises:
second stages that are each configured to output gate signals to different ones of the second gate lines; and
a second signal line to apply a clock signal to the second stages.

2. The display apparatus of claim 1, wherein the first gate driver comprises output lines to connect the first stages, wherein the output lines are insulated from and extend across the first signal line.

3. A display apparatus comprising:
a substrate comprising a first display area, a second display area, and a non-display area disposed around the first and second display areas;
first gate lines disposed in the first display area;
second gate lines disposed in the second display area;
data lines disposed in the first and second display areas and extending across the first and second gate lines;
pixels disposed in the first and second display areas and connected to the first and second gate lines and the first and second data lines; and
a first gate driver disposed in the non-display area, between the first and second display areas, the first gate driver comprising:
first stages configured to output gate signals to the first gate lines, to control the only pixels disposed in the first display area;
second stages configured to output gate signals to the second gate lines, to control only the pixels disposed in the second display area; and
a signal line disposed between the first stages and the second stages and configured to supply a clock signal to each of the first stages and the second stages.

4. A display apparatus comprising:
a substrate comprising a first display area, a second display area, and a non-display area disposed between the first and second display areas;
gate lines disposed on the substrate;
data lines disposed across the gate lines;
pixels disposed on the substrate and connected to the gate lines and the data lines;
a first gate driver disposed in the non-display area, between the first and second display areas;
a second gate driver disposed at a first edge of the substrate and extending parallel to the first gate driver; and
a third gate driver disposed at a second edge of the substrate and extending parallel to the first gate driver, the second edge of the substrate opposing the first edge of the substrate.

5. The display apparatus of claim 4, wherein:
the gate lines comprise:
first gate lines disposed in the first display area; and
second gate lines disposed in the second display area; and
the first gate driver comprises:
first stages that are each connected to different pairs of the first and second gate lines; and
a first signal line to apply the clock signal to the first stages.

6. The display apparatus of claim 4, wherein:
the second gate driver outputs the gate signals to the gate lines in the first display area; and
the third gate driver outputs the gate signals to the gate lines in the second display area.

7. The display apparatus of claim 6, wherein:
the second gate driver comprises:
second stages that are each connected to a different ones of the first gate lines; and a second signal line to supply a clock signal to the second stages; and the third gate driver comprises:

third stages that are each connected to different ones of the second gate lines; and a third signal line to apply a clock signal to the third stages.

8. A display apparatus comprising:

a substrate comprising a first display area, a second display area, and a third display area that are separated by portions of a non-display area;

gate lines disposed on the substrate;

data lines disposed across the gate lines;

pixels disposed on the substrate and connected to the gate lines and the data lines;

a first gate driver disposed in the portion of the non-display area disposed between the first and second display areas; and a second gate driver disposed in the portion of the non-display area disposed between the second and third display areas.

9. The display apparatus of claim 8, further comprising a third gate driver disposed facing the first gate driver across the first display area.

10. The display apparatus of claim 9, further comprising a fourth gate driver facing the second gate driver across the third display area.

11. The display apparatus of claim 1, further comprising a data driver to apply a data voltage to the data lines and disposed adjacent to one edge of the substrate.

12. The display apparatus of claim 11, further comprising a timing controller to output an image signal and a data control signal to the data driver, and to output a gate control signal to the first and second gate drivers, wherein the data driver outputs the data voltage based on the image signal and the data control signal, and the gate driver outputs the gate signal based on the gate control signal.

* * * * *